United States Patent
Roycroft et al.

(10) Patent No.: US 11,784,881 B1
(45) Date of Patent: Oct. 10, 2023

(54) VENDOR AGNOSTIC NETWORK DEVICE CONFIGURATION AUDIT PLATFORM

(71) Applicants: AT&T Intellectual Property I, L.P., Atlanta, GA (US); AT&T Global Network Services Belgium Luxembourg SPRL, Vilvoorde (BE)

(72) Inventors: Robert Roycroft, Algonquin, IL (US); Mrugesh Patel, San Francisco, CA (US); Thomas Barron, Lake Zurich, IL (US); Pierre Close, Esneux (BE); Eddy Hautot, Neuville-en-Condroz (BE); Anaël Closson, Namur (BE); Krishnapraveen Suri, Brentwood, CA (US); Angela Eborn, Salt Lake City, UT (US)

(73) Assignees: AT&T Intellectual Property I, L.P., Atlanta, GA (US); AT&T Global Network Services Belgium Luxembourg SPRL, Vilvoorde (BE)

( * ) Notice: Subject to any disclaimer, the term of this patent is extended or adjusted under 35 U.S.C. 154(b) by 0 days.

(21) Appl. No.: 17/954,577

(22) Filed: Sep. 28, 2022

(51) Int. Cl.
G06F 15/177 (2006.01)
H04L 41/0866 (2022.01)

(52) U.S. Cl.
CPC ................ *H04L 41/0866* (2013.01)

(58) Field of Classification Search
CPC ................................................ H04L 41/0866
See application file for complete search history.

(56) References Cited

U.S. PATENT DOCUMENTS

| | | | | |
|---|---|---|---|---|
| 8,370,818 B2* | 2/2013 | Osminer | .................. | G06F 8/73 |
| | | | | 717/143 |
| 10,229,185 B2* | 3/2019 | Pandit | .................. | G06F 16/316 |
| 10,956,460 B2* | 3/2021 | Pandit | .................. | G06F 16/316 |
| 2005/0004942 A1* | 1/2005 | Madsen | .............. | H04L 41/0894 |
| 2011/0191500 A1* | 8/2011 | Odayappan | ........ | G05B 19/0426 |
| | | | | 710/8 |
| 2017/0004203 A1* | 1/2017 | Pandit | .................. | G06F 16/316 |
| 2019/0205321 A1* | 7/2019 | Pandit | .................. | G06F 16/316 |
| 2021/0385133 A1* | 12/2021 | Notari | ................. | H04L 41/0873 |
| 2022/0247638 A1* | 8/2022 | Engi | ....................... | H04L 41/14 |
| 2022/0417090 A1* | 12/2022 | Singh | ..................... | G06Q 50/00 |

* cited by examiner

*Primary Examiner* — Richard G Keehn
(74) *Attorney, Agent, or Firm* — Guntin & Gust, PLC; John G. Rauch

(57) ABSTRACT

Aspects of the subject disclosure may include, for example, receiving a request for a configuration audit of a network device, identifying a class of the network device, retrieving a configuration template for the network device, wherein the retrieving is based on the class of the network device, wherein the configuration template is represented as a hierarchical tree structure, retrieving a current configuration of the network device, translating the current configuration of the network device to a tree data structure, comparing the tree data structure with the configuration template represented as a hierarchical tree structure, identifying discrepancies between the tree data structure and the configuration template represented as a hierarchical tree structure, reporting the discrepancies, receiving instructions to resolve the discrepancies, and modifying one of the current configuration for the network device and the configuration template for the network device, wherein the modifying is responsive to the instructions to resolve the discrepancies. Other embodiments are disclosed.

20 Claims, 9 Drawing Sheets

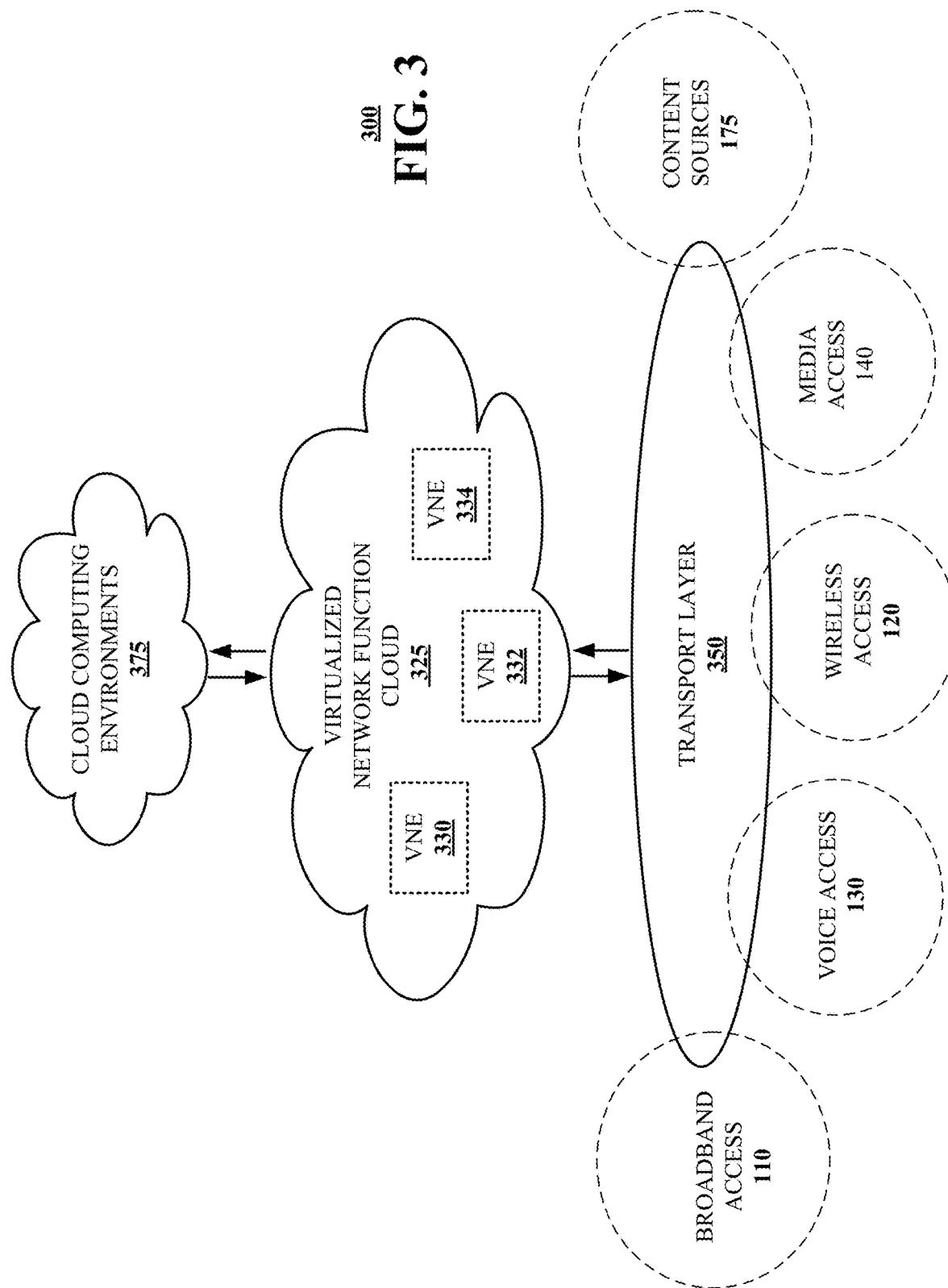

VENDOR AGNOSTIC NETWORK DEVICE CONFIGURATION AUDIT PLATFORM

FIELD OF THE DISCLOSURE

The subject disclosure relates to a configuration and parameter auditing for telecommunication network devices.

BACKGROUND

Network devices operating in, for example, a telecommunications network must be periodically audited to ensure the devices are operating with a correct, current configuration. The audit seeks to identify network devices that are missing features updates, patches, or have outdated configurations that need to be removed.

BRIEF DESCRIPTION OF THE DRAWINGS

Reference will now be made to the accompanying drawings, which are not necessarily drawn to scale, and wherein:

FIG. 2C, FIG. 2D and FIG. 2E depict an illustrative embodiment of a hierarchical structure of a model or template in accordance with various aspects described herein.

FIG. 3 is a block diagram illustrating an example, non-limiting embodiment of a virtualized communication network in accordance with various aspects described herein.

DETAILED DESCRIPTION

Figure 1:
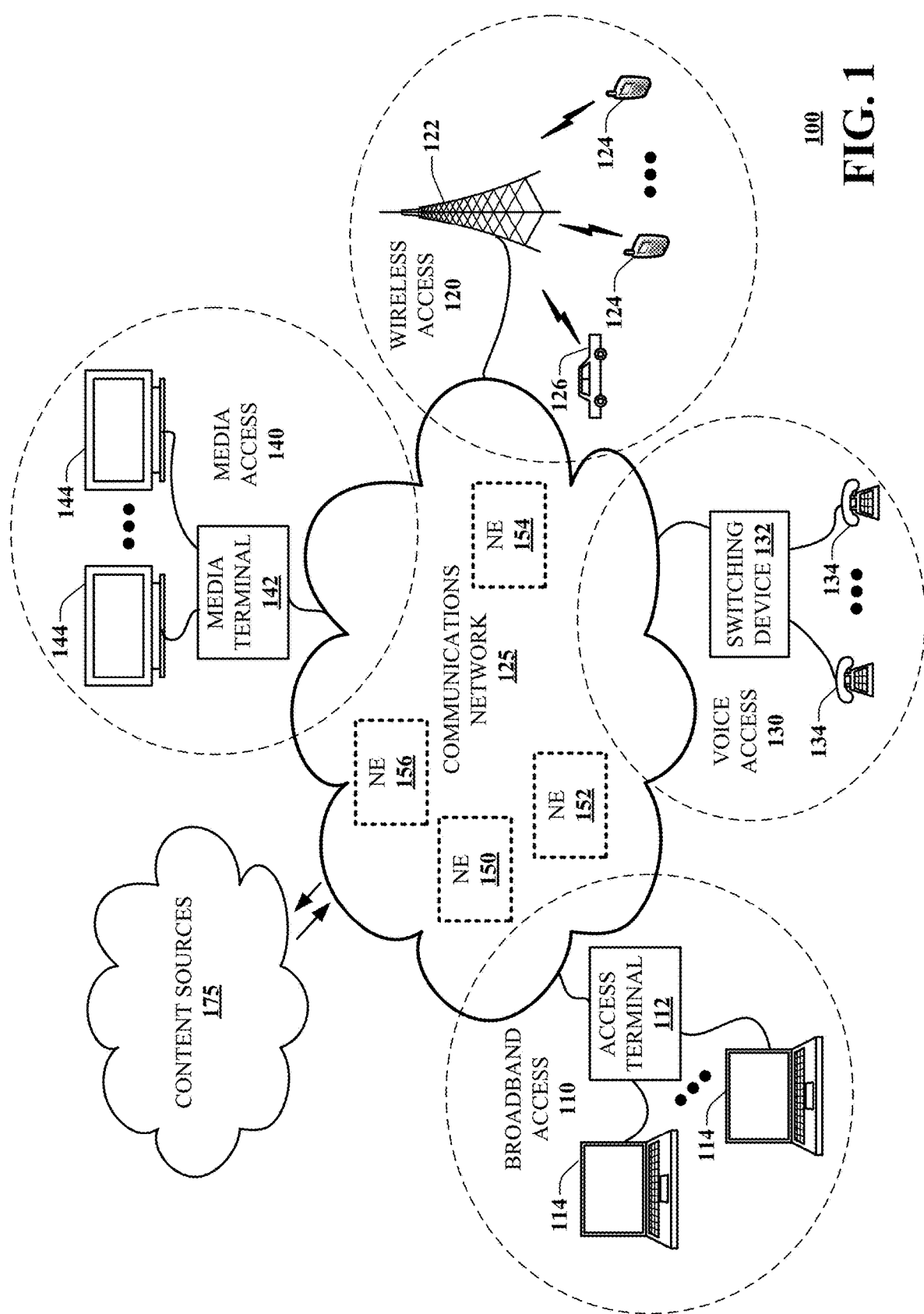
FIG. 1 is a block diagram illustrating an exemplary, non-limiting embodiment of a communications network in accordance with various aspects described herein.

The subject disclosure describes, among other things, illustrative embodiments for a simplified way to express, from a model view, a desired state for a configuration for a network device. The configuration may be used for tasks such as configuration validation for the network device. One example of a network device is a router located in a network and periodically receiving software updates, patches and other modifications. A software engine can examine the configurations of given devices such as the router in a specified way. A model is injected into the engine to annotate how the analysis should be performed. Various configurations can be identified depending on the type of services that the configurations support. A single model can, therefore, address all configurations in the network. The model can express any possible combinations that may be found on any class of network devices such as the router. This represents an improvement in efficiency over conventional verification process with a device-specific type of configuration designated for a single network device and one device configuration is compared with another. Other embodiments are described in the subject disclosure.

One or more aspects of the subject disclosure include receiving a request for a configuration audit of a network device, identifying a class of the network device, retrieving a configuration template for the network device based on the class of the network device, wherein the configuration template is represented as a hierarchical tree structure, and retrieving a current configuration of the network device. Aspects can further include translating the current configuration of the network device to a tree data structure, comparing the tree data structure with the configuration template represented as a hierarchical tree structure and identifying discrepancies between the tree data structure and the configuration template represented as a hierarchical tree structure. Aspects can further include reporting the discrepancies, receiving instructions to resolve the discrepancies, and modifying one of the current configuration for the network device and the configuration template for the network device responsive to the instructions to resolve the discrepancies.

One or more aspects of the subject disclosure include initiating a configuration audit of a family of network devices, each network device of the family of network devices performing a function in a network, identifying a class of the network device, retrieving a current configuration of a network device of the family of network devices, and retrieving a configuration template for the family of network devices based on the class of the network device. Aspects can further include comparing the current configuration of the network device with the configuration template for the family of network devices, identifying discrepancies between the current configuration of the network device and the configuration template for the family of network devices, and modifying one of the current configuration for the network device and the configuration template for the family of network devices to resolve the discrepancies.

One or more aspects of the subject disclosure include receiving a desired device configuration for network devices of a family of network devices, the network devices of the family of network devices having a common class for operation in a network, receiving one or more policies defining a configuration for the family of network devices, modifying the desired device configuration according to the one or more policies, forming a new template for the family of network devices and storing the new template for the family of network devices in a template catalog. Aspects can further include initiating a configuration audit of the family of network devices, retrieving a current configuration of a network device of the family of network devices, comparing the current configuration of the network device with the new template for the family of network devices, identifying discrepancies between the current configuration of the network device and the new template for the family of network devices, and resolving the discrepancies according to user input.

Referring now to FIG. 1, a block diagram is shown illustrating an example, non-limiting embodiment of a system 100 in accordance with various aspects described herein. For example, system 100 can facilitate in whole or in part transforming a variety of device configurations for network devices into a single model or template operable to audit the configurations of many thousands of instantiations of the network device on a network. The transformed device configurations are vendor agnostic and apply to all devices having a common device class or function in the network. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network element 150, network element 152, network element 154, network element 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
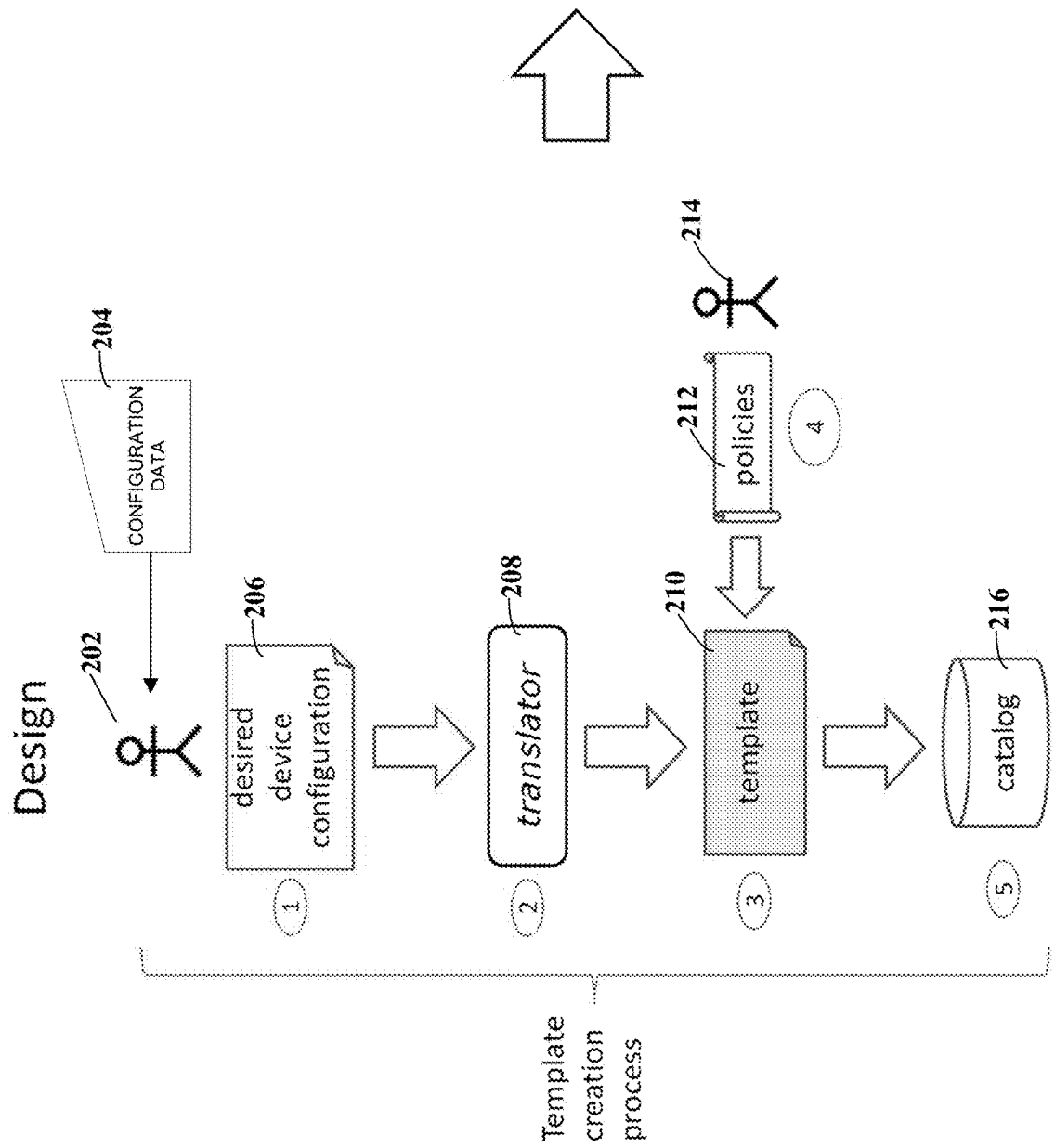
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a method 200 functioning within the communication network of FIG. 1 in accordance with various aspects described herein. The method 200 may be used with a network device configuration audit platform. The method 200 illustrates a design phase during which a model or template may be developed for comparing a vendor agnostic representation of the configuration for a network device for policy-based parameter auditing.

The network elements of the communications network 125 of FIG. 1, including network element 150, network element 152, network element 154, and network element 156 in embodiments are fabric devices forming the core network of system 100. The network elements include routers and other network communication devices that establish connectivity among devices and services of the system 100. In embodiments, the network elements can be any general-purpose component that has a configuration that specializes the general-purpose component for a particular, designated function. For example, one set of network elements may include routers that establish connectivity from a service provided by the system 100, such as fifth generation cellular service (5G), to the public internet. This set of routers operate to provide data communication between the base station or access point 122 and the internet so that mobile devices 124 of FIG. 1 can interact with web sites and other available resources. The network elements similarly connect to other endpoints in the communications network 125.

Each router or other network element, including network element 150, network element 152, network element 154, and network element 156, requires and is supplied with a configuration or configuration information. The configurations supplied to each network element depend on what type of services the network element provides. For example, a particular network element may be designated to participate in a particular path. The network element may have a certain set of services that are expected to traverse the network element based on its location or role in the network. Services such as broadband communications with the broadband access 110, wireless communications with the wireless access 122 and voice communication with the voice access 130 may require different configurations for the router or other network element involved. The configuration is provided to the network element to enable the necessary functionality required to provide the set of services.

Device configurations may change frequently. For example, services may be added or moved within a network such as the communications network 125. Devices may be repurposed in the network, from one function to another. Some device configurations may be relatively stable and dedicated to a persistent role. Nevertheless, software updates will be required and network connections around the device may change so that the configuration will sometimes change. At the other extreme, some devices may experience configuration changes or updates on a daily or near daily basis, for example in the case of a particularly dynamic network portion or service.

In the aggregate, network management must manage deployment of devices of a wide variety of functions. Managing deployment includes matching the expectation for what device is supposed to be providing services for what function. This must be done for the entire distributed network, based on knowledge of configurations are expected for each device.

In accordance with aspects described herein, a system and method provide a standardized construct to express auditing parameters for all configuration formats. The system and method may look at individual network devices and allows application of a standardized model. Use of the model enables determination whether the individual network device meets the expectation of its configuration. The configuration is the actual function of the individual network device in its designated context. The configuration specializes the network device for a designated function. For example, if the network device is a router that is intended to be switching traffic, the model allows the system and method to confirm that the router is switching traffic to the correct endpoints. The model is agnostic to the particular type of device, including particular brands of equipment and particular network functions. The system and method model and examine the configuration in an agnostic or generic way, independent of factors such as the vendor. In conventional systems, auditing parameters are not abstracted to a standardized construct. Instead, auditing parameters are expressed programmatically for each configuration format.

Using the present modelled approach, one model for a device can be expressed to handle all types of variations for device and functionality. For each particular network device, it is known that the particular network device is participating in a particular network function or service. Based on that information, it is known what the configuration parameters for the network device should include to properly perform that function or service, as compared with another device that may perform another function or service. Having the known correct configuration parameters, network management, using the system and method, can express a model adapted to each type of device and its particular variations.

Conventionally, it has not been possible to manage large number of variations in configurations, particularly when the configurations are changing. It is known to examine configuration information that does not vary over time. Network operations personnel can examine individual parameters and other information and manage them individually for a particular instance of a network device. A comparison of expected parameters can be made for each respective network device to identify discrepancies in a device configuration. However, this has been inefficient and ineffective.

Further, conventional techniques fail to account for different permutations and combinations that can happen in the configuration. Still further, conventional techniques do not give an indication of severity of configuration mismatch. For example, a network device located in a first location may contain additional parameters and the same type of device located in a second location may not contain the additional parameters, but this may not be an issue that requires attention. Some device configuration parameters are less critical than others, but conventional evaluation has no way to distinguish among them.

Conventionally, an improper combination of parameters at a network device would be detected after receiving a report. The report may originate from a user and may be in the form of a work ticket opened indicating that a feature is not functioning or is functioning improperly. Network operations personnel respond by studying configurations of suspected devices and doing comparisons to identify a problem. Alternatively, an automated internal tool may provide an indication to network operations personnel that monitored pathways in the network have fallen out of specification range for some key performance indicator. However, the network operations personnel have to first identify the failing network device, then identify the improper combination of parameters at that failing network device.

In contrast, embodiments of the system and method in accordance with aspects herein provide to the network operations personnel a report identifying the network, the failing network device in the network and the improper combination of parameters identified for that failing network device. Moreover, the system and method can operate proactively, to find the improper combination of parameters for a network device before the device fails. In embodiments, the model can be run periodically by network operations personnel, such as daily, to identify discrepancies. The personnel then plan maintenance activities during subsequent time windows to correct those discrepancies. The model may be used as a part of a feedback loop to identify and address possible issues in the network. For example, since the network does change and evolve over time, such as instantiation of a new service. When the new service is installed, an unintended modification may be made to an existing network device, or an intended modification may fail to be made. The model may inform the network operations personnel that the current configuration is not what is expected and should be investigated. The system and method operate according to a model that identifies what the proper combination of parameters should be for substantially all network devices that operate according to a configuration.

FIG. 2A illustrates an exemplary embodiment of a design phase method 200 for a network device configuration audit platform. The method 200 represents an exemplary template creation process for creating templates for auditing network device configurations in a communications network such as communications network 125 (FIG. 1). The method 200 may be performed at any suitable processing system including one or more processors and a memory for storing data and instructions. The processing system may be in data communication with one or more communications networks such as communications network 125. The method 200 may be initiated automatically or manually by network operations personnel or others.

The method 200 may be initiated by a designated subject matter expert 202 for a given device. The subject matter expert 202 may be a human or group of humans. The subject matter expert 202 may be assisted by one or more data sources such as data source 204 or data processing devices. In embodiments, such data processing devices can include intelligent functions such as a machine learning model or artificial intelligence module. The subject matter expert 202 may receive from the data source 204 information about established rules within an organization and accumulated knowledge and experience that may be documented and contained in data source 204. The subject matter expert may rely on information provided by a manufacturer or vendor of the particular network device.

The subject matter expert 202 may receive from the data source 204 or other source information about one or more particular functions a network device is to perform. Such information may relate to services the network device is to provide, such as serving as a switch in a communications network or serving as a gateway to another network such as the internet. The subject matter expert 202 may receive information about network connections for the particular network device, including data communication protocols to use for communicating with other devices in the network.

The subject matter expert 202 may be an individual or group within network operations personnel with at least a basic understanding of the particular network device and of what is appropriate for a configuration out of the particular network device. The network device may be any network element that requires configuration information to provide a particular function. Examples of the network device include service switching points, signal transfer points, service control points, network gateways, media distribution hubs, servers, firewalls, routers, edge devices, switches and other network nodes for routing and controlling communications traffic over wired, optical and wireless links. The network device may be located anywhere in a network and may serve any function.

At step 206, the subject matter expert 202 develops a desired device configuration. The desired device configuration represents the configuration information for the network device as it would be expected to be for the particular network device and its designated function. The desired device configuration is based on the information available to the subject matter expert including information from the data source 204 and the information about the functions the network device is to perform. In some embodiments, an initial template is automatically developed for the subject matter expert 202 to modify and customize according to the particular network device.

The desired device configuration may have a format customized for the particular network device or particular device software of a particular vendor. In an example, the desired device configuration may be for a router provided by vendor Cisco Systems, Inc. The router has a command line interface (CLI) format including words that describes features such as an interface including properties for the interface. The properties may include a network termination unit, whether the interface requires a partner on the other end of the connection, and an internet protocol (IP) address for the interface. Such information is expressed in the CLI format for the desired device configuration. In the desired device configuration, there will be many statements that start with or include the term "interface" to define the parameters for each interface of the network device.

In another example, the network device may be a router that operates on the Junos OS operating system of Juniper Networks, Inc. In another example, the network device may be a Containerized Network Function or Cloud Native Function designated for operation on a device manufactured by Ericsson, Inc. The desired device configuration may be in any format, including CLI format or application programming interface (API) format. The method 200 is agnostic to the source or format of the desired device configuration, meaning that any conventionally available format, data structure, command structure and operating system environment are accommodated.

At translation process 208, the desired device configuration produced at step 206 is translated to a common format. The common format represents a standardized construct to express auditing parameters for all configuration formats including those formats in which the desired device configuration of step 206 was prepared. In embodiments, the translator or translation process 208 translates the native format desired device configuration into a hierarchical representation in a template 210. In the translation, every selected parameter of the desired device configuration is associated as context to surrounding parameters for that selected parameter. In the example of the Cisco router, many statements of the desired device configuration include or start with the term "interface," such as Interface A, Interface B, Interface C, etc. Each instance of the term may be a root of a hierarchical path to be examined for the network device. The translator can then conclude that the next available parameter, and whatever its optional values are, must belong to the interface and define some characteristic of the interface. A different section of the desired device configuration that is associated with another aspect of the device, such as a switching connection for the router, will include its own set of parameters, each with its own set of possible values. Upon translation, that section of the desired device configuration becomes associated with its own hierarchical path. The translation process 208 operates to create a hierarchical path of these possible parameters as they exist in these individual proprietary configurations into that same hierarchical path throughout the template for the desired device configuration.

In an exemplary embodiment, a translator or translation process 208 models the device configuration of step 206 into JavaScript Object Notation, or JSON. JSON is a data interchange format. It is generally human-readable and operates to transmit data objects consisting of attribute-value pairs and array. The JSON model may be called the template 210. The template 210 or new template is the output of the translation process 208.

The template 210 contains policy constructs as defined by the user. The policy constructs instruct the system performing the configuration validation on how to evaluate a specific configuration. In embodiments, both the template and the transformed configuration may be represented as a tree data structure in JSON format. The device configuration may be native or proprietary to a particular function. The device configuration is transformed into modelled template view.

Subsequently, one or more policies 212 may be applied by personnel 214 to the template. The personnel 214 may be network operations personnel, for example a subject matter expert, with knowledge of individual functions and connections of the network devices in the network. Policies set out requirements, limits and boundaries on parameters for a particular configuration for a particular instantiation of a network device or family of network devices. Thus, in an example, a policy may specify that a network device located in a first location may contain additional parameters relative to the same type of device located in a second location. The particular policy for the network device at the first location may permit the additional parameters while the particular policy for the network device at the second location may not permit the additional parameters. The personnel 214 generate the policy 212. The policy annotates the template 210. As will be discussed below in conjunction with FIG. 2B, the template 210 drives an audit engine or audit process. The policy 212 generated by the personnel 214 operates to inform the audit engine of conditional items for each network device so that the engine will derive the right answer at run time.

As noted, in embodiments, the template includes a set of hierarchical paths. The translation process 208 creates a hierarchical path of possible parameters as they exist in these individual proprietary configurations, or the desired device configuration, into that same hierarchical path throughout. Every step along the way in the hierarchical path presents an opportunity to apply a policy. As a simple, example, at the root level, the personnel 214 could specify a policy of "Do Not Audit." In another example, a policy may present the fact that interfaces may exist only under certain conditions. When the audit engine operates on the policy, each those conditions will be evaluated and a conclusion will be drawn about the required presence of the interface, based on the conditions. The policy can set the requirements for any parameter throughout the hierarchy.

The personnel 214 will describe through the policy 212 what an audit engine will audit for the particular network device. For example, the personnel 214 will specify parameters for the desired device configuration and acceptable or unacceptable values for those parameters. The policy will specify that, for example, in this particular path at this section these variations are expected. The expected variations are then expressed in policies at that particular point in the configuration.

In embodiments, method 200 may include a loop including steps of development of the policy 212, application of the policy to the template 210, observation of results and modification of the policy to obtain desired results. The personnel 214 can iterate through modifications of the policy 212 until the policy is considered acceptable for auditing a network device. The personnel 214 receive immediate feedback on the effects of any policy modifications.

When the personnel 214 is satisfied with the policy, the policy is stored to the catalog 216 for subsequent production use. The policy 212 may also be referred to as a model. The data of the policy 212 may be stored in the catalog 216 until the policy is deployed. When a network device is to be audited, contextual information of the network device is used to identify the correct policy or template to use for the audit. The catalog 216 may be formed using any suitable data store or combination of data storage devices which are accessible over a network. In embodiments, the catalog may store policies according to class where class refers to purpose. Thus, if the network operator deploys thousands of routers of a particular class, a single policy 212 or model may be used to audit each of those routers.

Figure 2B:
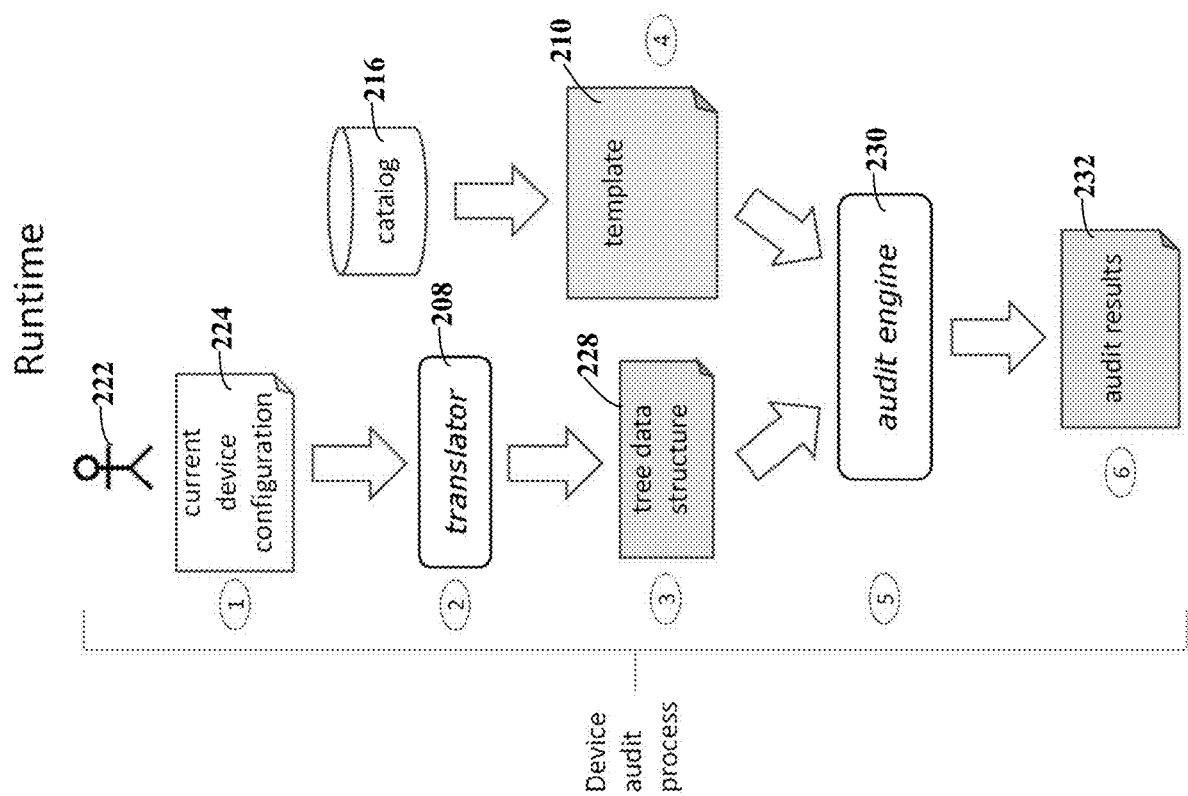
FIG. 2B is a block diagram illustrating an example, non-limiting embodiment of a method functioning within the communication network of FIG. 1 in accordance with various aspects described herein.

FIG. 2B is a block diagram illustrating an example, non-limiting embodiment of a method 220 functioning within the communication network of FIG. 1 in accordance with various aspects described herein. The method 220 may be used with a network device configuration audit platform for auditing configuration parameters for network devices. The method 220 illustrates a runtime phase during which a configuration audit is performed using a model or template 210 developed in the design phase of FIG. 2B. The template 210 is used for comparing a vendor agnostic representation of the configuration for a network device for policy-based parameter auditing. The method 220 may be performed by any suitable data processing system such as an operations console used by network operations personnel 222 to monitor network performance and status.

The method 220 relies on a translator or translation process 208 which, in embodiments, may be the same as translation process 208 used in the design process of method 200, FIG. 2A. Further, the method 220 relies on the catalog 216 which was populated during the design process of method 200. The catalog 216 contains policies or rule sets to be applied when auditing device configuration of network devices in a communications network.

The method 220 may be initiated in any suitable manner. For example, network operations personnel 222 may trigger a request for a current device configuration 224 to be collected. This may be done, in embodiments, manually by the network operations personnel accessing a suitable interface. Alternatively, initiation of the method 220 may be done automatically in response to any suitable condition. For example, the method 220 may be initiated on a routine or periodic basis, such as daily or weekly. The method 220 may run automatically to verify device configuration for an entire network or subnetwork and generate a report or any other suitable output. For example, a network may be defined for auditing and current device configuration 224 information collected for each device on the defined network. The current device configuration 224 information may be communicated over one or more networks to the operations console or other processing system for performing the operations of method 220. In an alternative, for example, the network operations personnel may the operations console or other processing system select to verify and receive a report on just one device or a few devices, for whatever reason of interest. The generated report provides information about the results of the configuration audit performed on one or more network devices.

The current device configuration 224 is collected from a running instance of a network device. That is, the network device is actively in operation in the network, operating according to the parameters of the current device configuration 224. The current device configuration 224 may include a number of configuration parameters with values selected for controlling the network device.

The current device configuration 224 is provided to the translator or translation process 208. The translation process 208 converts the current device configuration 224 to a comparative generalized view. Such a comparative generalized view is similar to the policy 212 modifying the template 210 of FIG. 2A. The comparative generalized view produced by the translation process 208 may be in the form of a tree data structure 228, having a hierarchical structure. The hierarchical tree data structure 228 includes a model view of the current device configuration 224 with all appropriate annotations about how the policies would be applied at every given possible path parameter in the current device configuration. In embodiments, the tree data structure 228 may be in JSON format or with JSON notation, but other suitable formats may be used. The tree data structure 228 may have a top-level root and all the possible parameters associated with the root, branching down through a hierarchy. The translation process 208 may be the same as translation process 208 of FIG. 2A or may operate in a different manner to identify and extract the tree data structure 228 corresponding to the current device configuration 224.

An audit engine process 230 receives the tree data structure 228, which is the translated current device configuration that was collected for the network device. Further the audit engine process 230 receives from the catalog 216 a template 210. The template 210 is modified according to a policy for the current network device under consideration. The template 210 represents the expected view of the configuration parameters for the current network device based on the policy 212 specified for that current network device.

The audit engine process 230 compares the template 210 for the current device with the tree data structure 228 translated from the current device configuration 224. The audit engine process 230 identifies any misconfigurations in which an entry of the tree data structure 228 does not match a corresponding entry for the template 210.

A misconfiguration as detected by the audit engine process 230 may be defined in any suitable manner. In an exemplary embodiment, the misconfigurations may occur in multiple categories. In a first category, according to the template 210, the audit engine process 230 did not find a particular parameter in the tree data structure 228 for the current device configuration 224. That is, the template 210 indicated the particular parameter should be defined and have a specified value in the current device configuration 224 but data corresponding to the parameter was not present. In a second, complementary category, the audit engine process 230 found in the tree data structure 228 for the current device configuration 224 a parameter that is not in the template 210. This may be termed a not in template or not in model error. In a third category, a parameter of the tree data structure 228 for the current device configuration 224 falls outside of an expected range of values specified by the template 210. For example, a particular parameter may be an expected range or allowable range of 1 to 20, inclusive, specified by the template 210. If the tree data structure 228 for the current device configuration 224 specifies that that parameter of the current device configuration 224 has a value of 25, a fail condition error may be generated.

At step 232, audit results are generated by the method 220. The audit results form a representation of the misconfiguration possibilities for the current device configuration 224. The audit results may be provided to network operations personnel 222 for further analysis and resolution. The audit results may be provided in any suitable form or format such as a screen display displayable on an operations console, summary reports, detailed reports, and others.

Based on the audit results generated at step 232, may develop a plan of corrective action to resolve discrepancies in the audit results. In one example, the template 210 needs to be brought into synchrony with the current device configuration. The discrepancy may occur because some new parameter or feature or service has been added to the current device configuration and the template 210 needs to be updated to reflect the change. In another example, the discrepancy may occur because a parameter had an incorrect value in the current device configuration 224. The value in the current device configuration 224 is incorrect because it does not match the value specified in the template 210 or because the value falls outside the permitted range specified in the template 210. In another example, the current device configuration 224 includes more parameters or fewer parameters than the template 210, creating a discrepancy that must be corrected in the current device configuration.

While for purposes of simplicity of explanation, the respective processes are shown and described as a series of blocks in FIG. 2A and FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
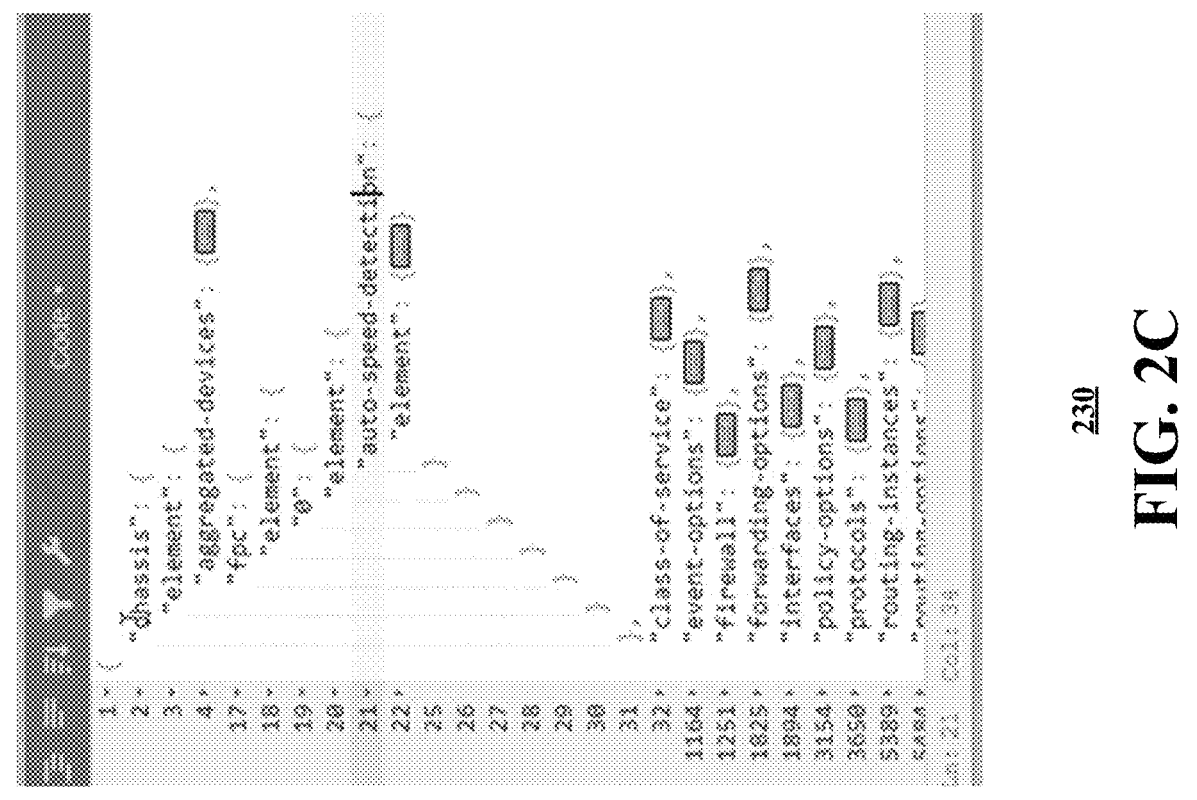

FIG. 2C depicts an illustrative embodiment of a hierarchical structure of a model or template 210 in accordance with various aspects described herein. The template 210 may be adapted for display on a display screen or other device of a network operations console for example, for viewing and manipulation by network operations personnel. The template 210 includes several parameters at a top level of hierarchy of parameters. These top-level parameters include chassis, class-of-service, event-options, firewall, forwarding-options, interfaces, policy-options, protocols, routing-instances, routing-options, SNMP, system, and version, in this example. The configuration file for the network device includes the same parameters including the illustrated top-level parameters.

The template 210 is designed to model the intended configuration of the particular network device. The template 210 may be designed, for example according to method 200 of FIG. 2A, to verify the configuration of a particular switch device in a network. In some examples, the switch device may be referred to as a spine and may be implemented in a network cloud. In the example, the network may include a family of many thousands of these switch devices located in a wide variety of geographic locations, in data communication over one or more networks. These switch devices may be considered to be a family of network devices based on their function in the network and they may be referred to as having a particular class with a class identifier. All network devices of a family of network devices have the same class and class identifier. These switch devices of the family of network devices are intended to have matching configurations stored for each switch device. The model or template 210 may be used to verify all of these switch devices of the same class or family of network devices. At each particular switch device, for the particular switch device, the same top-level parameters illustrated in FIG. 2C in the template 210 are stored in the configuration file of the particular switch device to control how the particular switch device is to be configured and will operate.

In an embodiment, the presentation of the template 210 may be accessed from storage such as the catalog 216 and displayed in any suitable manner on a display device under control of network operations personnel. The network operations personnel may use a touch screen or a mouse to interact with the display and select each level of hierarchy of the template 210 to display subordinate levels. A portion set of subordinate levels of the top-level chassis parameter is visible in the example of FIG. 2C.

Hierarchically beneath the top-level chassis parameter, there are two parameters that are expected to be present in configuration. These parameters are named the aggregated-devices parameter and the fpc parameter. In the hierarchical tree of the template 210, these are show indented and in lines below the callout of the chassis parameter to indicate that these two parameters are subordinate to or at a lower hierarchical level than the chassis parameter. Similar, when the fpc parameter is expanded, a parameter 0 appears on a subordinate level. Similarly, parameter auto-speed-detection appears on a subordinate level. Each of these parameters in the template 210 are expected to be present when the configuration of a particular switch device operating on the network is audited.

In the design process exemplified in FIG. 2A, the translation process 208 is used to develop a template 210 having a tree structure, a portion of which is illustrated in FIG. 2C. The template 210 models the configuration for a particular network device that is currently active in the network. The template 210 is stored in the catalog 216. During run time, as illustrated in FIG. B, the template 210 is retrieved from the catalog 216 and the translation process 208 translates the current device configuration 224 to a hierarchical structure representing the current device configuration 224. The audit engine process 230 performs a comparison of comparison of the two hierarchical structures. Any parameters that are misconfigurations, such as parameters that do not match or are anomalous, are reported in a report or other mechanism. For example, human network operations personnel review the report and take steps to make corrections. Such steps may include updating the template 210 to account for a change that has been made to the current device configuration or correcting the current device configuration according to the misconfigurations to produce a corrected device configuration for future use by the device.

Figures 2D, 2E:
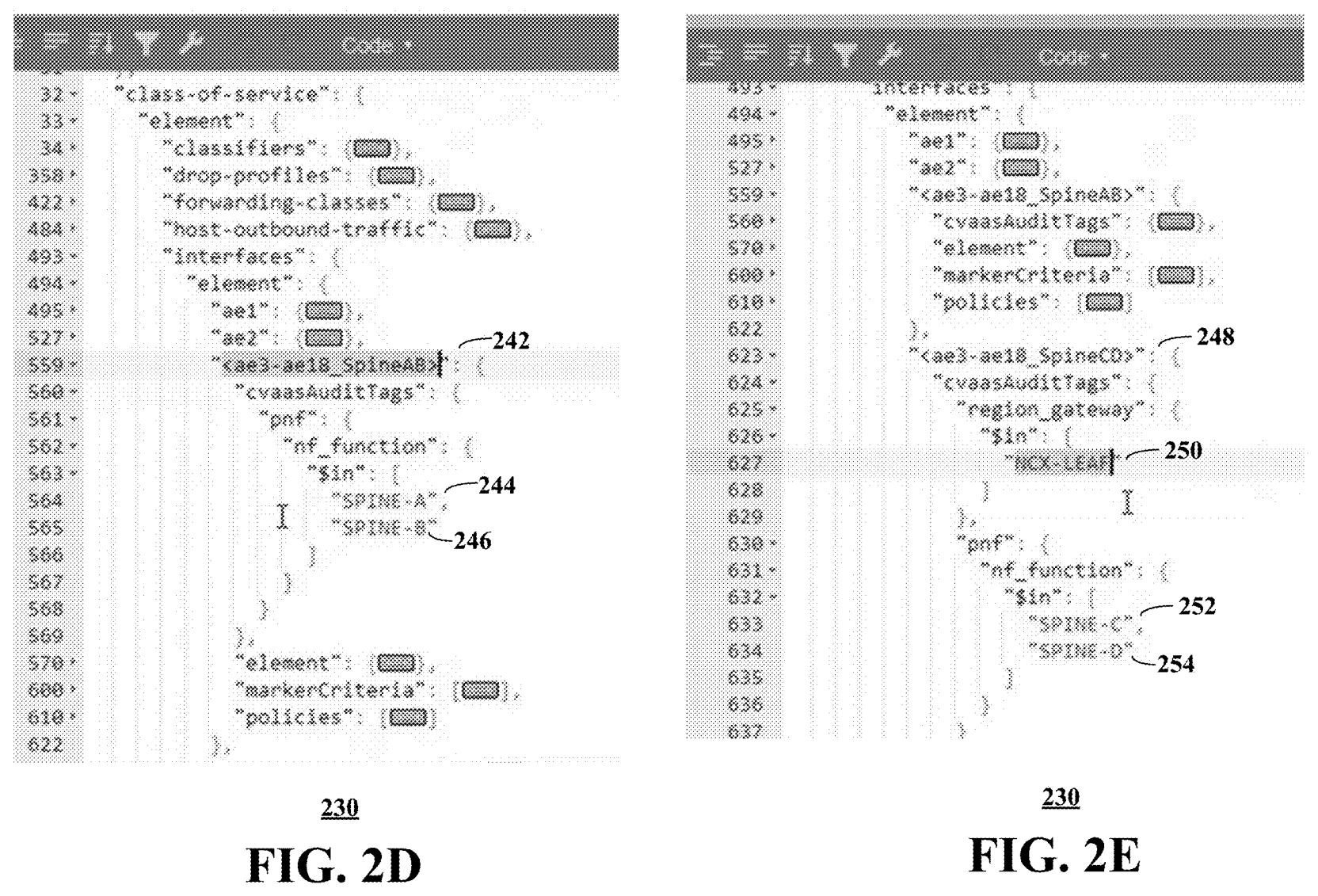

FIG. 2D and FIG. 2E depict alternate illustrative embodiments or views of the hierarchical structure of a model or template 210 in accordance with various aspects described herein. The template 210 illustrates a different portion of the template 210 illustrated in FIG. 2C. FIG. 2D illustrates parameters in the class-of-service section of the configuration modelled by template 210. The class-of-service parameter includes several subordinate potential parameters available for the class-of-service parameter including a classifiers parameter, a drop-profiles parameter, a forwarding-classes parameter, a host-outbound-traffic parameter and an interface parameter.

Hierarchically beneath the interfaces parameter are two explicitly named interface parameters named ae1 parameter and ae2 parameter. Further under the interfaces parameter is a model view. The template 210 includes two separate sets of configurations, designated <ae3-ae18_SpineAB> (shown in FIG. 2D) and <ae3-ae18_SpineCD> (shown in FIG. 2E).

The template 210 forms a single model that can be used to examine all possible permutations of a configuration in the network. Thus, the template 210 includes a first set 242 of parameters labelled as <ae3-ae18_SpineAB> and a second set 248 of parameters labelled as <ae3-ae18_SpineCD>. The network devices being audited by the model may be designated as one of SPINE-A, SPINE-B, SPINE-C, or SPINE-D. Depending on how the actual network device is being audited, a particular path through the hierarchical tree structure of template 210 is selected and the parameters of that portion of the template 210 are compared with actual parameters of the current device configuration 224 in the runtime process of FIG. 2B.

In the example template 210 of FIG. 2D, as indicated at parameter value 244 and parameter value 246, the network device being audited may either be designated as SPINE-A or SPINE-B. The network device designated as SPINE-A should have a first configuration and the network device designated as SPINE-B should have a second configuration. The template 210 models both the first configuration and the second configuration.

During runtime, the audit engine process determines that the particular network device is either designated as SPINE-A or SPINE-B. That defines a context for the network device. Then the audit engine process operates to examine the entire pathway including the parameters labelled <ae3-ae18_SpineAB>, cvaasAuditTags, pnf, nf_function and $in according to that context.

In FIG. 2E the template 210 illustrates a different portion of the template 210 illustrated in FIG. 2C and FIG. 2D. In contrast with the example of FIG. 2D, the template 210 does not indicate a context in which a network device is either designated as SPINE-A or SPINE-B. In the example, the set 248 of parameters <ae3-ae18_SpineCD> does not include a designated context of SPINE-A or SPINE-B so the path of parameters will not be examined according to that context. Instead, the set 248 of parameters <ae3-ae18_SpineCD> has additional parameters such as region gateway and further information about context for the network device. In particular, the set 248 of parameters labelled <ae3-ae18_SpineCD> includes a parameter 250 labelled NCX-_LEAF, a parameter 252 labelled SPINE-C and a parameter 254 labelled SPINE-D. Thus, if the device is designated as a SPINE-C or a SPINE-D device, it should have associated with it a network device designated as an NCX-LEAF. During the auditing process, if the current device configuration does not call out an NCX-LEAF device, that will be reported as a misconfiguration in the report to network operations personnel. The devices designated as SPINE-A or SPINE-B are not expected to have an association with an NCX-LEAF device so the absence of an NCX-LEAF connection would not be considered a misconfiguration.

Thus, according to the model or template 210, there is a difference between a switching device in the network that is a spine and that is classified as a SPINE-A and a SPINE-B versus a device classified as a SPINE-C or a SPINE-D. The model or template 210, using the hierarchical structure illustrated in FIG. 2C, FIG. 2D and FIG. 2E, may accommodate all types of devices during auditing.

Accordingly, the system and method in accordance with aspects described herein provides a single model view in a configuration audit platform for network devices. Network operations personnel understand individual network devices and their classes or functions, such as a spine and leaf switching device. The single model view provides a single interface that enables development of a template modified by a policy that allows the network operations personnel to define an expected audit value for all devices in all classes. Thus, a particular network device may be a Juniper Networks device such as a router running a Junos OS operating system and serving in the network as a spine switching device. The function may be referred to as the class. There may be many other Juniper Networks devices running Junos OS that do not serve as a spine switching device. For a family of network devices, such as all devices running Junos OS and serving as spines, a single model or template can examine all devices of that class in the network. The model-policy approach permits the audit engine to examine all those different, disparate instances of devices serving as spines in a single, viewable, controllable, model or template. A model or template is created for each different type of network device. That type can contain numerous devices and numerous permutations and combinations of parameters in a configuration.

When an audit is run, the audit process determines what type of device is being audited. For example, that information can be found in a look-up database using device identification or a network address for the device. In an example, it may be determined from the database or other information that the type of network device is a spine switching device and determine its particular usage. Based on the type of network device and usage, the appropriate template 210 may be retrieved from the catalog 216 The current device configuration 224 is retrieved from the device and translated in translation process 208 into a hierarchical tree data structure 228. The tree data structure 228 for the current device configuration is compared with a tree structure for the template 210 retrieved from the catalog 216, such as is illustrated in FIG. 2C, FIG. 2D and FIG. 2E. Any discrepancies between the current device current configuration and the template 210 are identified and reported. A human network operations personnel may provide instructions to resolve the discrepancies, such as by modifying the current network configuration or modifying the template 210. Responsive to the instructions, the discrepancies are resolved, and the configuration is validated as a new device configuration.

In embodiments, the network under device being audited using a model or template may be a standalone component such as a router or a containerized network function (CNF) or other virtual network function. Virtual Network Functions (VNFs) are virtualized network services running on open computing platforms formerly carried out by a standalone component using proprietary, dedicated hardware technology. Common VNFs include virtualized routers, firewalls, wide area network (WAN) optimization, and network address translation (NAT) services. In such embodiments, the router includes an operating system and a configuration for hardware and software. The CNF or other virtual function may solely include code that can be moved and instantiated where needed, but still includes a configuration that may be audited according to a model. For a standalone device and a CNF of that same class (i.e., that perform the same function), the same model may be retrieved from the catalog 216 and used for the configuration audit. The two instances of the same class device look completely different but that does not matter from the perspective of the model. They may be audited with the same model.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of method 200, and method 220 presented in FIG. 1, FIG. 2A, FIG. 2B, FIG. 2C, FIG. 2D, FIG. 2E, and FIG. 3. For example, virtualized communication network 300 can facilitate in whole or in part transforming a variety of device configurations for network devices of the virtualized communication network 300 into a single model or template operable to audit the configurations of many thousands of instantiations of the network device on a network. The transformed device configurations are vendor agnostic and apply to all devices having a common device class or function in the network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
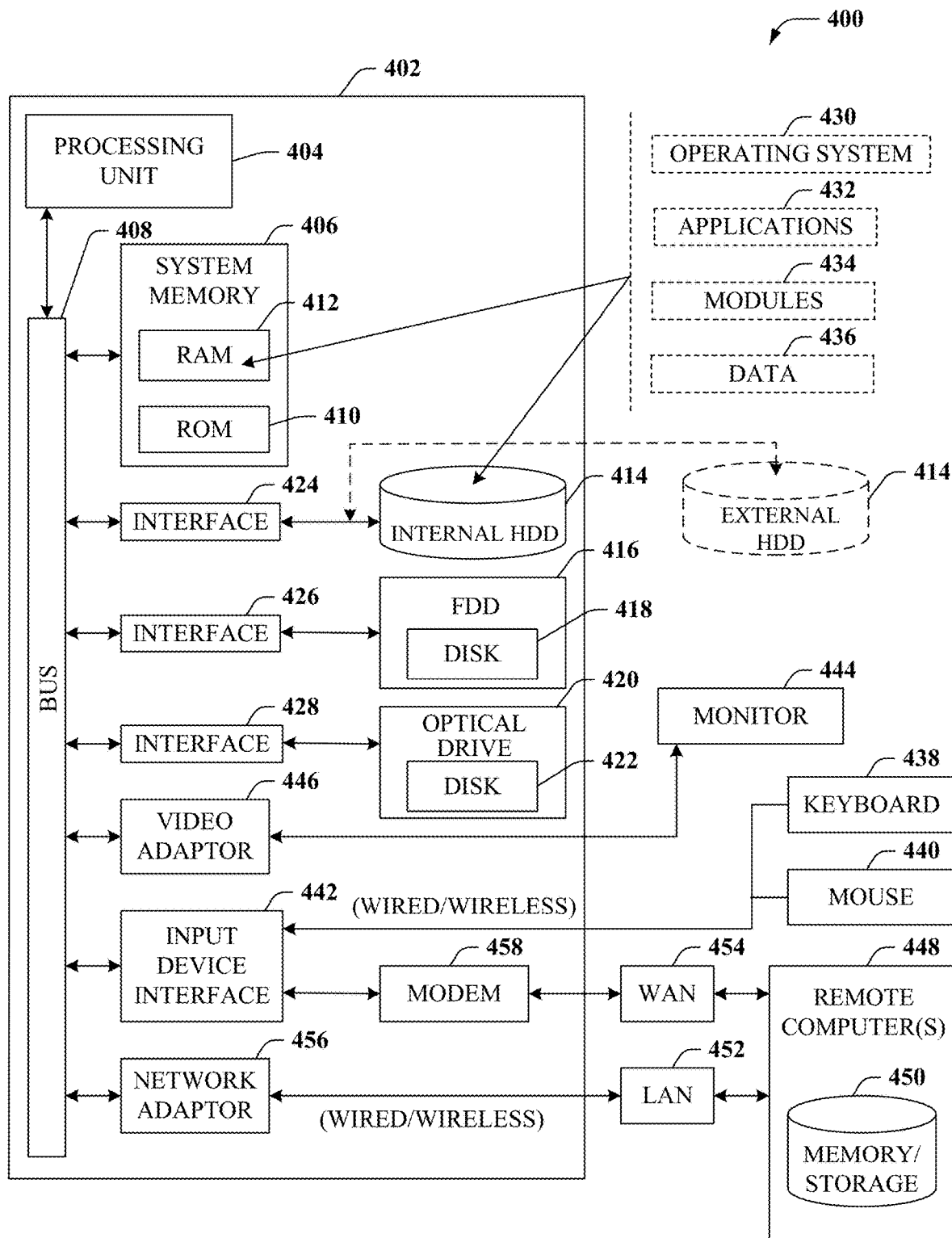
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part transforming a variety of device configurations for network devices into a single model or template operable to audit the configurations of many thousands of instantiations of the network device on a network. The transformed device configurations are vendor agnostic and apply to all devices having a common device class or function in the network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
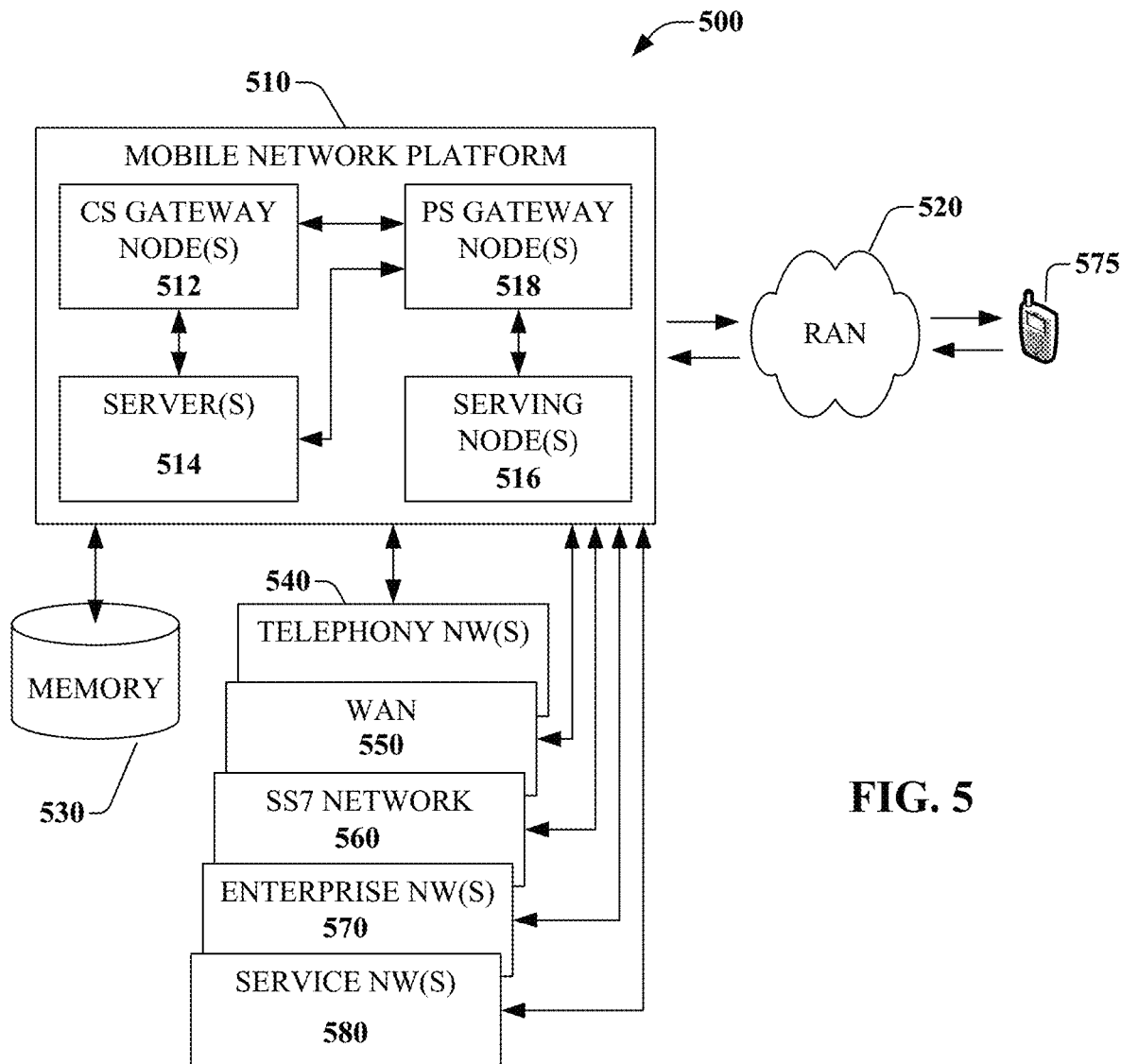
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part transforming a variety of device configurations for network devices into a single model or template operable to audit the configurations of many thousands of instantiations of the network device on a network. The transformed device configurations are vendor agnostic and apply to all devices having a common device class or function in the network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
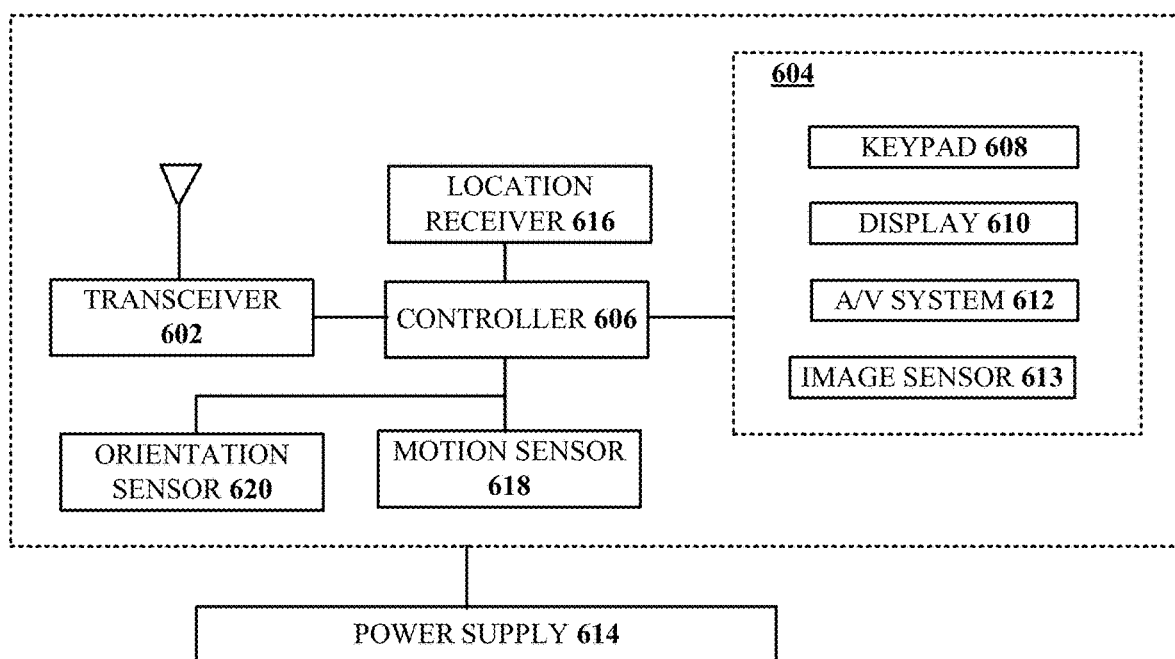
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part transforming a variety of device configurations for network devices into a single model or template operable to audit the configurations of many thousands of instantiations of the network device on a network. The transformed device configurations are vendor agnostic and apply to all devices having a common device class or function in the network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via a observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving a request for a configuration audit of a network device;
identifying a class of the network device;
retrieving a configuration template for the network device, wherein the retrieving is based on the class of the network device, wherein the configuration template is represented as a hierarchical tree structure;
retrieving a current configuration of the network device;
translating the current configuration of the network device to a tree data structure;
comparing the tree data structure with the configuration template represented as a hierarchical tree structure;
identifying discrepancies between the tree data structure and the configuration template represented as a hierarchical tree structure;
reporting the discrepancies;
receiving instructions to resolve the discrepancies; and
modifying one of the current configuration for the network device and the configuration template for the network device, wherein the modifying is responsive to the instructions to resolve the discrepancies.

2. The device of claim 1, wherein the receiving a request for a configuration audit of a network device comprises:
receiving a request to perform a configuration audit on a plurality of network devices, each network device of the plurality of network devices having a device class that matches the class of the network device.

3. The device of claim 2, wherein the operations further comprise:
retrieving a single configuration template for the configuration audit on the plurality of network devices and for the network device.

4. The device of claim 1, wherein the comparing the tree data structure with the configuration template further comprises:
selecting a configuration parameter value of the configuration template, forming a selected configuration parameter value; and
identifying a matching configuration parameter value of the tree data structure, wherein the matching configuration parameter value matches the selected configuration parameter value.

5. The device of claim 4, wherein the operations further comprise:
identifying a discrepancy between the tree data structure and the configuration template in response to the tree data structure having no configuration parameter value matching the selected configuration parameter value.

6. The device of claim 4, wherein the operations further comprise:
identifying a discrepancy between the tree data structure and the configuration template in response to a configuration parameter value of the tree data structure having no corresponding configuration parameter value of the configuration template.

7. The device of claim 4, wherein the operations further comprise:
determining a permitted range of values for the selected configuration parameter value;
determining a value of the matching configuration parameter value of the tree data structure; and
identifying a discrepancy between the tree data structure and the configuration template in response to the value of the matching configuration parameter value of the tree data structure being outside the permitted range of values for the selected configuration parameter value.

8. The device of claim 1, wherein the identifying a class of the network device comprises:
identifying a function of the network device or a service performed by the network device.

9. The device of claim 1, wherein the operations further comprise:
receiving a desired device configuration for the network device;
translating the desired device configuration to a new template;
receiving one or more policies, wherein the one or more policies define aspects of the current configuration of the network device;
modifying the new template according to the one or more policies, forming the configuration template for the network device; and
storing the configuration template for the network device for subsequent use in future configuration audits of the network device and other network devices have the class of the network device.

10. The device of claim 9, wherein the operations further comprise:
translating the desired device configuration of the network device to a tree data structure, forming the new template.

11. A non-transitory machine-readable medium, comprising executable instructions that, when executed by a processing system including a processor, facilitate performance of operations, the operations comprising:
initiating a configuration audit of a family of network devices, each network device of the family of network devices performing a function in a network;
identifying a class of the network device;
retrieving a current configuration of a network device of the family of network devices;
retrieving a configuration template for the family of network devices, wherein the retrieving is based on the class of the network device;
comparing the current configuration of the network device with the configuration template for the family of network devices;
identifying discrepancies between the current configuration of the network device and the configuration template for the family of network devices; and
modifying one of the current configuration for the network device and the configuration template for the family of network devices to resolve the discrepancies.

12. The non-transitory machine-readable medium of claim 11, wherein the operations further comprise:
translating the current configuration of the network device to a tree data structure; and
comparing tree data structure with the configuration template for the family of network devices, wherein the configuration template is represented as a hierarchical tree structure.

13. The non-transitory machine-readable medium of claim 12, wherein the operations further comprise:
displaying the configuration template as the hierarchical tree structure on a display device for review by network operations personnel.

14. The non-transitory machine-readable medium of claim 11, wherein the operations further comprise:
- reporting the discrepancies between the current configuration of the network device and the configuration template for the family of network devices to network operations personnel; and
- receiving, from the network operations personnel, instructions to resolve the discrepancies for the network device of the family of network devices.

15. The non-transitory machine-readable medium of claim 11, wherein the comparing the current configuration of the network device with the configuration template for the family of network devices comprises:
- selecting a configuration parameter value of the configuration template for the family of network devices comprises, forming a selected configuration parameter value; and
- identifying a matching configuration parameter value of the current configuration of the network device, wherein the matching configuration parameter value matches the selected configuration parameter value.

16. A method, comprising:
- receiving, by a processing system including a processor, a desired device configuration for network devices of a family of network devices, the network devices of the family of network devices having a common class for operation in a network;
- receiving, by the processing system, one or more policies defining a configuration for the family of network devices;
- modifying, by the processing system, the desired device configuration according to the one or more policies, forming a new template for the family of network devices;
- storing, by the processing system, the new template for the family of network devices in a template catalog;
- initiating, by the processing system, a configuration audit of the family of network devices;
- retrieving, by the processing system, a current configuration of a network device of the family of network devices;
- comparing, by the processing system, the current configuration of the network device with the new template for the family of network devices;
- identifying, by the processing system, discrepancies between the current configuration of the network device and the new template for the family of network devices; and
- resolving, by the processing system, the discrepancies according to user input.

17. The method of claim 16, comprising:
translating, by the processing system, the desired device configuration of a family of network devices to a tree data structure, forming the new template for the family of network devices having a hierarchical tree structure.

18. The method of claim 17, further comprising:
- translating, by the processing system, the current configuration of the network device to a tree data structure; and
- comparing, by the processing system, tree data structure with the new template for the family of network devices having a hierarchical tree structure.

19. The method of claim 18, wherein the comparing comprises:
- selecting, by the processing system, a configuration parameter value of the new template for the family of network devices having a hierarchical tree structure, forming a selected configuration parameter value; and
- identifying, by the processing system, a matching configuration parameter value of the tree data structure, wherein the matching configuration parameter value matches the selected configuration parameter value.

20. The method of claim 16, comprising:
- reporting, by the processing system, the discrepancies; and
- receiving, by the processing system, user input providing instructions to resolve the discrepancies.

\* \* \* \* \*